United States Patent [19]

Swick et al.

[11] Patent Number: 5,447,029

[45] Date of Patent: Sep. 5, 1995

[54] HYDROSTATIC TRANSMISSION CONTROL SYSTEM

[75] Inventors: William C. Swick, Raleigh, N.C.; David P. Smith, Joliet, Ill.

[73] Assignee: Caterpillar Inc., Peoria, Ill.

[21] Appl. No.: 224,944

[22] Filed: Apr. 8, 1994

[51] Int. Cl.6 .................. F16D 39/00; F16D 31/02
[52] U.S. Cl. ........................................ 60/492; 60/494
[58] Field of Search ............... 60/487, 491, 492, 494, 60/490, 443; 91/505

[56]  References Cited

U.S. PATENT DOCUMENTS

| | | | |
|---|---|---|---|
| 3,561,212 | 2/1971 | Pinkerton et al. | 60/492 |
| 4,546,847 | 10/1985 | Abels | 60/492 X |
| 4,554,991 | 11/1985 | Eden | 60/490 X |
| 4,951,462 | 8/1990 | Graf | 60/491 X |
| 5,121,603 | 6/1992 | Widemann | 60/490 X |
| 5,184,466 | 2/1993 | Schniederjan et al. | 60/491 X |

Primary Examiner—Edward K. Look
Assistant Examiner—Hoang Nguyen
Attorney, Agent, or Firm—Calvin E. Glastetter

[57] ABSTRACT

Hydrostatic transmissions are useful for propelling a machine to do work and travel relative to the ground. In performing work functions and during travel it is desirable to adjust machine speed to aid in handling the machine. The subject hydrostatic transmission control system includes a infinitely adjustable creeper hand lever which can be moved to any desired position and be maintained in the selected position until moved by the operator. A spring biased inching pedal can be used in combination with the creeper lever to further adjust the machine speed. This arrangement of components provides a control system for the hydrostatic transmission which can be adjusted and maintained at a desired setting.

12 Claims, 1 Drawing Sheet

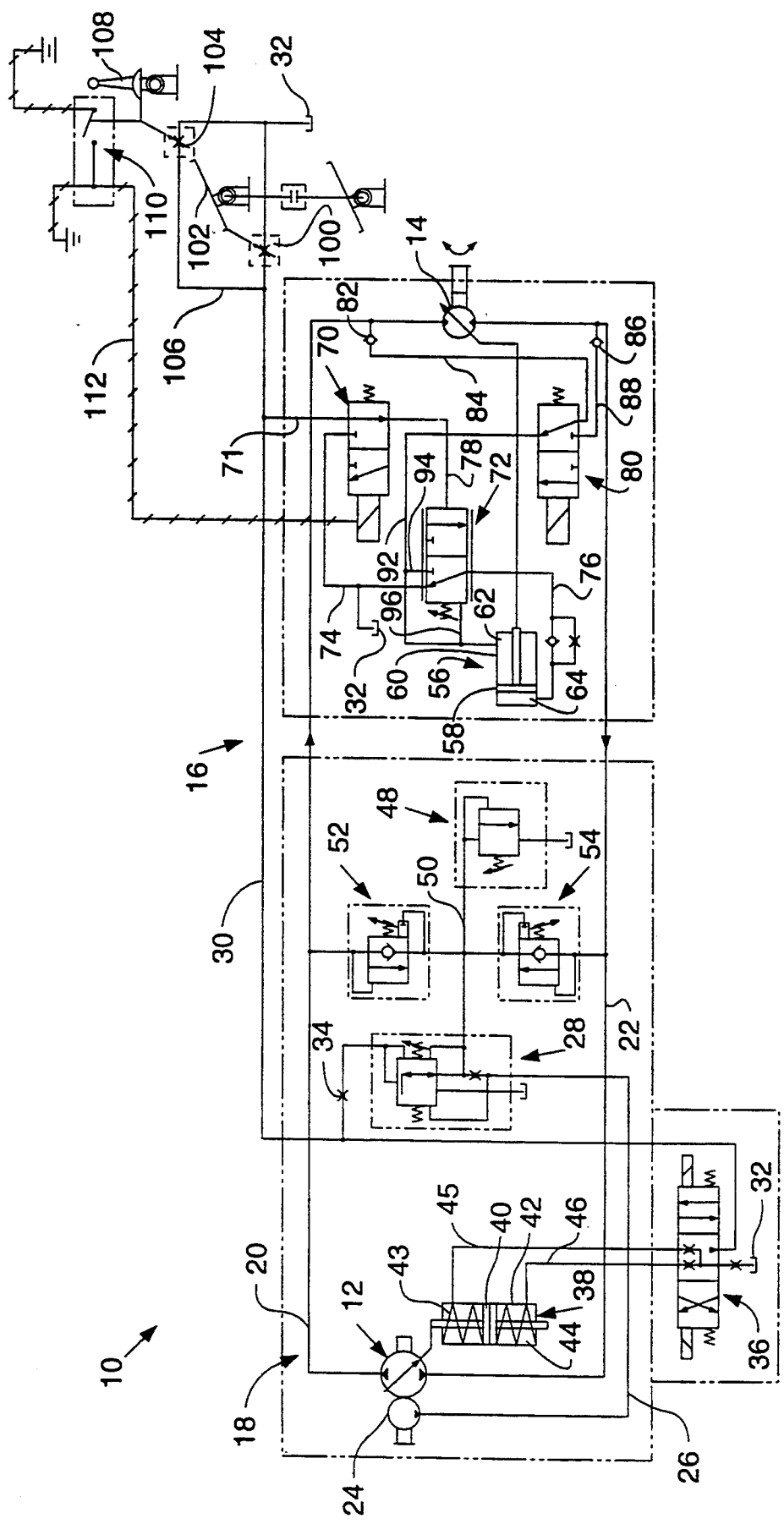

HYDROSTATIC TRANSMISSION CONTROL SYSTEM

TECHNICAL FIELD

This invention relates to a hydrostatic transmission and more particularly to a control system for controlling the displacement of the pump and motor.

BACKGROUND ART

Hydrostatic transmissions are useful for propelling a machine for traveling to perform work functions. In order to momentarily slow the travel speed of the machine, while maintaining engine speed, it is necessary to have a rabbit/turtle to change displacement of the motor to set a lower travel speed and a spring biased foot operated creeper pedal to adjust the displacement of the pump and motor to vary the travel speed in response to depression of the foot pedal by an operator. One of the problems associated with such an arrangement of having a spring biased foot pedal is that the operator must maintain a force on the pedal to maintain the reduced speed. This can develop operator fatigue and a difficulty in maintaining a constant.

The present invention is directed to overcoming one or more of the problems as set forth above.

DISCLOSURE OF THE INVENTION

In one aspect of the present invention a hydrostatic transmission includes a variable displacement motor driven by a variable displacement pump. A control system is used to control the displacement of the pump and motor. The system includes a common pressure control signal line which is connected to the pump displacement controller and the motor displacement controller. A solenoid valve is disposed in the signal line. The solenoid valve has a non-energized position which communicates the signal line to the motor displacement controller. The solenoid valve has an energized position which communicates the displacement controller with the tank. A variable orifice is connected to the signal line to control the fluid pressure level in the signal line. A limit switch is connected to the solenoid valve. The limit switch has a closed position at which the solenoid valve is engaged. A control lever is provided to adjust the position of the variable orifice and to move the limit switch to the closed position.

The present invention provides a control system for controlling the displacement of the variable displacement motor and the variable displacement pump. The control system includes a variable orifice connected to the signal line and a limit switch connected to the solenoid valve to control the fluid pressure level in the signal line. Thus the displacement of the pump and motor will be adjusted by movement of the variable orifice and the solenoid valve. A hand lever which is frictionally retained in any operative position is provided to reduce operator fatigue and to maintain a reduced travel speed as set by the position of the hand lever.

BRIEF DESCRIPTION OF THE DRAWINGS

The drawing is a schematic of a hydrostatic transmission and control system.

BEST MODE FOR CARRYING OUT THE INVENTION

Referring to the drawing, a hydrostatic transmission 10 embodying the present invention is schematically illustrated. The hydrostatic transmission 10 includes a variable displacement over-center pump 12 and a variable displacement motor 14 fluidly driven by the pump 12. The motor 14 will propel a vehicle (not shown) to a desired speed, in a well know manner. A control circuit 16 is provided for controlling the displacement of the pump 12 and motor 14. It is noted that the hydrostatic transmission could have more than one pump or motor without departing from the invention. A closed loop 18 has a first drive line 20 and a second drive line 22 for fluidly driving the motor 14 by pressurized fluid from the pump 12. An engine, not shown, driven charge pump 24 supplies fluid to the control circuit 16. A line 26 connects the charge pump 24 to a pressure reducing valve 28. A common pressure control signal line 30, connects the valve 28 to a tank 32 for controlling the displacement of the pump 12 and the motor 14. An orifice 34 is positioned within the common pressure control signal line 30 and, as is well known, is effective to create a pressure drop thereacross in response to the fluid flow therethrough. A three position directional control valve 36 is connected to the control signal line 30 and to a pump displacement controller 38 for changing direction and displacement of the pump 12. The controller 38 includes a piston 40 slidably positioned within a housing 42 and is connected to the pump 12. The housing 42 has a first pressure chamber 43 and a second pressure chamber 44. A line 45 connects the valve 36 to the first pressure chamber 43. A line 46 connects the valve 36 to the second pressure chamber 44. The valve 36 is spring biased to a first centered operative position and moveable to a second or a third operative position in response to an electrical signal generated in response to the machine controls being moved to one of its forward or reverse operative positions. In the first operative position fluid flow from line 30 is blocked. In the second operative position the line 45 is in fluid communication with line 30 and line 46 is in communication with the tank 32. In the third operative position the line 46 is in fluid communication with line 30 and the line 45 is in fluid communication with the tank 32. A relief valve 48 is connected to the valve 28 by a line 50. A first relief and replenishing valve 52 is connected between the line 50 and the line 20. A second relief and replenishing valve 54 is connected between the line 50 and the line 22.

A motor displacement controller 56 is provided for changing the displacement of the motor 14. The motor controller 56 includes a piston 58 slidable positioned within a housing 60 and connected to the motor 14. The housing 60 has a first pressure chamber 62 and a second pressure chamber 64. A solenoid operated valve 70 is connected to the signal line 30 by a line 71. An infinitely positionable pilot operated valve 72 is connected to the first solenoid valve 70 and the tank 32 by a line 74 and to the second pressure chamber 64 of the controller 56 by a line 76. The valve 70 is connected to one end of the valve 72 by a line 78. A solenoid operated valve 80 is connected through a check valve 82 to the drive line 20 by a line 84 and connected through a check valve 86 to the drive line 22 by a line 88. The solenoid operated valve 80 is connected to the controller 56 by a line 92 and connected to the valve 72 by the line 92 and a line 94. A line 96 connects the line 92 to the other end of the valve 72. The solenoid operated valve 70 is a two-position valve spring biased to a first operative position at which the line 71 is in fluid communication with the line 78 and moveable in response to an electric signal to its second operative position at which the line 78 is in fluid communication with the tank 32 through line 74. The pilot operated valve 72 is a spring biased two-position valve moveable from its first spring biased position at which the line 76 is in fluid communication with the tank 32 through the line 74 towards its second operative position at which the line 94 is in fluid communication with the line 76. The pilot operated valve 72 is moveable toward its second position in response to a pressure signal in line 78. The solenoid operated valve 80 is a two-position valve spring biased to a first operative position at which the line 94 is in fluid communication with the line 92 and moveable to its second operative position at which the line 88 is in fluid communication with the line 92. The solenoid operated valve 80 is moveable to its second operative position in response to an electrical signal generated in response to the machine controls being moved to one of its forward or reverse operative positions.

A first variable control orifice 100 is normally in a closed position to block the control line 30 from the tank 32. A spring biased inching pedal 102 is provided for adjusting the position of the first variable control orifice 100. The inching pedal is normally biased to maintain the orifice 100 in the closed position and is moved to open the orifice 100 in response to force being applied by the operator. The inching pedal 102 will return to its normal position when the operator force is removed. A second variable control orifice 104 is in a line 106 connected to the control signal line 30 so that the second orifice 104 is in parallel with the first orifice 100. The second orifice is normally in a closed position to block the control line 30 and line 106 from the tank 32. An infinitely adjustable creeper hand lever 108 is provided for adjusting the position of the second variable orifice 106. The creeper hand lever 108 is frictional retained in any operative position that is selected by the operator. The hand lever 108 is normally maintained in a operative position wherein the orifice 106 is in a closed position. When moved to reduce machine speed the hand lever 108 will close a rabbit/turtle limit switch 110 continued movement of the lever 108 will move the orifice 106 toward an open position. The switch 110 can also be closed by the operator independent of movement of the hand lever. Closing the limit switch 110 will send an electrical signal through a line 112 to energize the solenoid valve 70 to move to its second position. However, the electrical signal could be connected to the solenoid valve 70 through any suitable electronic control box.

Industrial Applicability

In operation of the present invention of the hydrostatic transmission 10 the pump 12 supplies fluid flow to the motor 14, in a well know manner, for propelling the machine at a preselected travel speed. The pump 12 will supply fluid to the motor 14 through line 20. Fluid will be returned to the pump 12 through line 22 in one direction of operation. Fluid flow will be reversed in another direction of operation of the pump 12. The degree of operator input will determine the machine rate of speed.

When the inching pedal 102 is depressed to slow the machine speed the variable orifice 100 is moved from the closed position toward the open position. Opening the orifice 100 will communicate the line 30 with the tank, thus creating a pressure drop to reduce the pressure in the line 30 downstream of the orifice 34. Reduction of the pressure in the line 30 effectively moves the controller 38 to decrease the displacement of the pump 12 thus decreasing fluid and effectively allows the valve 72 to move to its first position thus moving the controller 56 to increase the displacement of the motor to slow the speed of the machine.

To limit the speed range of the machine the limit switch 110 is closed to energize the solenoid valve 70, thus blocking fluid flow in the line 71. Blocking the fluid flow in the line 71 will effectively allow the valve 72 to move to its first position thus moving the controller 56 to increase the displacement of the motor 14.

The creeper hand lever 108 can be moved to any desired position to limit the speed of the machine. The lever 108 will be frictionally retained, by any suitable means, ill any operative position as selected by the operator, Movement of the lever 108 will close the switch 110 to energize the solenoid valve 70 thus blocking fluid flow in the line 71. Further movement of the lever 108 will move the orifice 104 toward the open position to communicate the line 30 with the tank 32, thus reducing fluid pressure in the line 30 to decrease the displacement of the pump 12 and increase the displacement of the motor 14. The creeper lever 108 can be positioned in any desired position to adjust machine speed and the inching pedal 102 can be used in combination with the creeper lever 108 to further adjust the machine speed.

In view of the foregoing, it is readily apparent that the hydrostatic transmission control system of the present invention provides a creeper hand lever which is frictionally retained in any desired operative position to adjust and maintain the speed of the machine. The spring biased inching pedal can be used in combination with the creeper hand lever to further adjust the machine speed.

Other aspects, objects and advantages of this invention can be obtained from a study of the drawing, the disclosure and the appended claims.

We claim:

1. A hydrostatic transmission having a variable displacement motor fluidly driven by a variable displacement pump and a control circuit for controlling a displacement controller of the pump and a displacement controller of the motor, the circuit including a common pressure control signal line connected to the pump displacement controller and the motor displacement controller, comprising:
    a solenoid valve disposed in the signal line and having a non-energized position communicating the signal line to the motor displacement controller and an energized position communicating the displacement controller with a tank;
    a first variable orifice connected to the signal line to control pressure level in the signal line;
    a limit switch connected to the solenoid valve and having a closed position at which the solenoid valve is energized; and
    an infinitely positionable control lever to adjust the first variable orifice and to move the limit switch to the closed position.

2. The hydrostatic transmission of claim 1 wherein the control lever is frictionally retained in any operative position as selected.

3. The hydrostatic transmission of claim 2 wherein the control lever is a infinitely adjustable hand creeper lever.

4. The hydrostatic transmission of claim 1 wherein the control system includes a second variable orifice connected to the signal line to control the fluid pressure level in the signal line, the second variable orifice being connected in the control system parallel to the first variable orifice.

5. The hydrostatic transmission of claim 4 wherein the control system includes a foot pedal to adjust the position of the second variable orifice.

6. The hydrostatic transmission of claim 1 wherein the limit switch, is connected to the solenoid valve by an electrical signal line.

7. A hydrostatic transmission having a variable displacement motor fluidly driven by a variable displacement pump and a control circuit for controlling a displacement controller of the pump and a displacement controller of the motor, the circuit including a pressure control signal line for the pump displacement controller and the motor displacement controller, comprising:

a solenoid valve disposed in the control circuit and having a first position communicating the control circuit to the motor displacement controller and a second position communicating the displacement controller with a tank;

a first variable orifice connected to the control circuit to control pressure level in the control circuit;

a limit switch having a closed position at which an electrical signal is sent to the solenoid valve to change the position of the solenoid valve; and an infinitely positionable control lever to adjust the position of the first variable orifice and to move the limit switch to the closed position.

8. The hydrostatic transmission of claim 7 wherein the control circuit includes a second variable orifice connected to the control circuit to control the fluid pressure level in the control circuit, the second variable orifice being connected in the control circuit parallel to the first variable orifice.

9. The hydrostatic transmission of claim 8 wherein the control circuit includes a inching foot pedal to adjust the position of the second variable orifice.

10. The hydrostatic transmission of claim 7 wherein the control lever is an infinitely positionable hand controlled creeper lever.

11. The hydrostatic transmission of claim 10 wherein the control lever is frictionally retained in any position as selected by the operator.

12. The hydrostatic transmission of claim 7 wherein the limit switch is connected to the solenoid valve by an electrical signal line.

* * * * *